(12) United States Patent
Tommasi et al.

(10) Patent No.: US 12,555,003 B2
(45) Date of Patent: Feb. 17, 2026

(54) SELF IMPROVING ANNOTATION QUALITY ON DIVERSE AND MULTI-DISCIPLINARY CONTENT

(71) Applicant: International Business Machines Corporation, Armonk, NY (US)

(72) Inventors: Pierpaolo Tommasi, Dublin (IE); Charles Arthur Jochim, Dublin (IE); Joao H Bettencourt-Silva, Dublin (IE); Alessandra Pascale, Phoenix Park Racecourse (IE)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 17/112,396

(22) Filed: Dec. 4, 2020

(65) Prior Publication Data

US 2022/0180224 A1    Jun. 9, 2022

(51) Int. Cl.
*G06N 5/04* (2023.01)
*G06N 5/02* (2023.01)
*G06N 20/00* (2019.01)

(52) U.S. Cl.
CPC ............. *G06N 5/04* (2013.01); *G06N 20/00* (2019.01); *G06N 5/02* (2013.01)

(58) Field of Classification Search
CPC ...... G05B 13/00; G05F 16/00; G06N 3/0895; G06N 5/02; G06N 5/022; G06N 5/025; G06N 5/04; G06N 20/00; G06V 10/225; G06V 10/70; G06V 10/7753; G06V 20/47;

(Continued)

(56) References Cited

U.S. PATENT DOCUMENTS

| 9,311,599 B1 | 4/2016 | Attenberg et al. |
| 9,928,278 B2 | 3/2018 | Welinder et al. |
| 10,496,369 B2 | 12/2019 | Guttmann |

(Continued)

FOREIGN PATENT DOCUMENTS

KR    10-2081037    2/2020

OTHER PUBLICATIONS

Synced, "Data Annotation: The Billion Dollar Business Behind AI Breakthroughs", https://medium.com/syncedreview/data-annotation-the-billion-dollar-business-behind-ai-breakthroughs-d929b0a50d23, Aug. 28, 2019, Printed on Aug. 14, 2020, 14 pages.

(Continued)

*Primary Examiner* — Daniel T Pellett
(74) *Attorney, Agent, or Firm* — Scully, Scott, Murphy & Presser, P.C.; Yuanmin Cai

(57) ABSTRACT

Content can be dynamically associated to an annotator based on machine learning of annotator expertise and dynamically maintaining a set of labels and relationships among the labels. A probable group of labels associated with the content can be determined by a first machine learning model. Using a set of labels and relationships among the set of labels maintained dynamically, a second machine learning model can select an annotator having subject matter expertise associated with the probable group of labels. The first machine learning model and the second machine learning model can be retrained based on annotations performed on the content by the annotator as feedback. A third machine learning model can dynamically maintain the set of labels and the relationships among the set of labels.

17 Claims, 8 Drawing Sheets

(58) Field of Classification Search
CPC ............ G06V 20/70; G06V 30/19173; G06V 30/194; G06V 40/172; G06V 2201/03
See application file for complete search history.

(56) References Cited

U.S. PATENT DOCUMENTS

| | | | |
|---|---|---|---|
| 10,977,518 B1* | 4/2021 | Sharma | G06V 10/774 |
| 11,263,391 B2* | 3/2022 | Potts | G06F 40/279 |
| 11,893,772 B1* | 2/2024 | Gokalp | G06N 20/00 |
| 2005/0027664 A1 | 2/2005 | Johnson et al. | |
| 2011/0071967 A1* | 3/2011 | Fung | G06N 20/00 706/12 |
| 2013/0346356 A1 | 12/2013 | Welinder et al. | |
| 2014/0344191 A1 | 11/2014 | Lebow | |
| 2018/0060307 A1* | 3/2018 | Misra | G06N 3/08 |
| 2019/0050428 A1* | 2/2019 | Hou | G06F 40/169 |
| 2019/0384807 A1 | 12/2019 | Dernoncourt et al. | |
| 2020/0152316 A1 | 5/2020 | Lee et al. | |
| 2020/0160231 A1* | 5/2020 | Asthana | G06F 16/9024 |
| 2020/0372338 A1* | 11/2020 | Woods, Jr. | G06Q 10/063112 |
| 2022/0019729 A1* | 1/2022 | Sharma | G06F 40/169 |

OTHER PUBLICATIONS

Hovy, D., et al., "Learning Whom to Trust with MACE", Proceedings of NAACL-HLT 2013, Jun. 9-14, 2013, pp. 1120-1130.

Dipper, S., et al., "Towards User-Adaptive Annotation Guidelines", https://www.aclweb.org/anthology/W04-1904.pdf, Printed on Aug. 14, 2020, 7 pages.

Appen, "Figure Eight", https://appen.com/tag/figure-eight/, Printed on Aug. 17, 2020, 8 pages.

Amazon Mechanical Turk, Inc., Amazon Mechanical Turk, https://www.mturk.com/, Printed on Nov. 20, 2020, 5 pages.

Amazon Mechanical Turk, Inc., "Mechanical Turk—Features", https://www.mturk.com/product-details, Printed on Nov. 20, 2020, 3 pages.

Appen, "Annotation Capabilities", https://appen.com/solutions/annotation-capabilities/, Printed on Nov. 20, 2020, 9 pages.

Wikipedia, "Figure Eight Inc.", https://en.wikipedia.org/wiki/Figure_Eight_Inc., Last edited on Oct. 24, 2020, Printed on Nov. 20, 2020, 5 pages.

Amazon Web Services (AWS), "Figure Eight Data Labeling Platform", https://aws.amazon.com/solutionspace/financial-services/solutions/figure-eight/, Printed on Nov. 20, 2020, 6 pages.

NIST, "Nist Cloud Computing Program", http://csrc.nist.gov/groups/SNS/cloud-computing/index.html, Created Dec. 1, 2016, Updated Oct. 6, 2017, 9 pages.

Youtube, Screen capture from YouTube video clip entitled "Mturk easy work", https://www.youtube.com/watch?v=UumoaPFPyMg, uploaded on Mar. 7, 2019 by user "Mturk Worker", 1 page.

Youtube, Screen capture from YouTube video clip entitled "Amazon MTurk Made Easy," https://www.youtube.com/watch?v=CwT0JTxy2YU, uploaded on Apr. 21, 2016 by user "Fun and Budget with Tinesha Davis", 1 page.

* cited by examiner

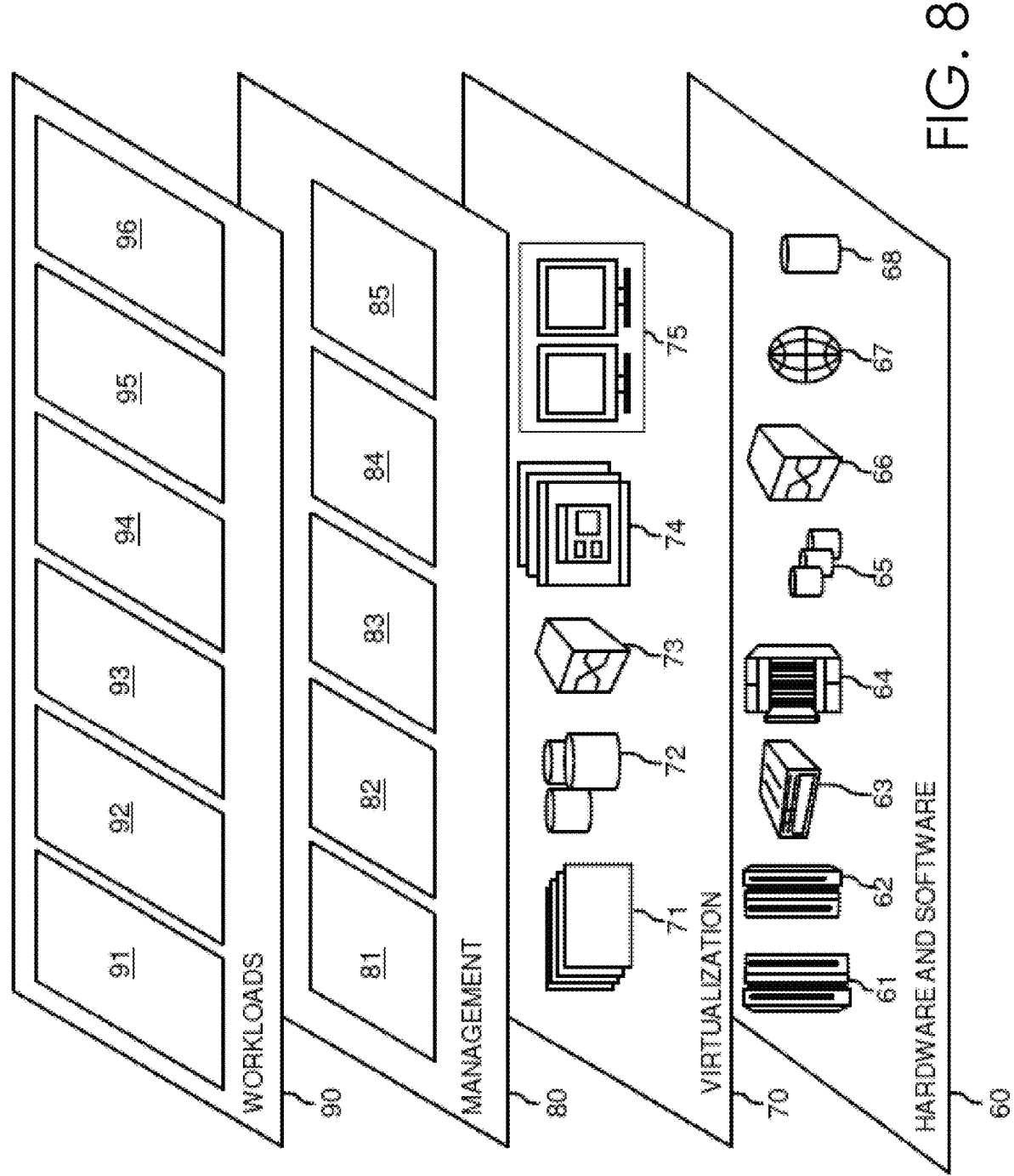

SELF IMPROVING ANNOTATION QUALITY ON DIVERSE AND MULTI-DISCIPLINARY CONTENT

BACKGROUND

The present application relates generally to computers and computer applications, and more particularly to machine learning and improving generating of labeled training data for machine learning.

Machine learning allows a machine such as a computer processor to automatically learn to perform a task and to improve itself in performing the task from experience without being explicitly programmed. Supervised and semi-supervised machine learning relies on properly labeled data in the learning process. Generally, a data annotation process involves annotators such as subject matter experts (SMEs) engaged to perform initial labeling. While a popular approach for data annotation is crowd sourcing, currently, only limited approaches to engaging annotators exist. For example, companies engage non-specialized annotators for their tasks and/or engage domain experts for their tasks.

Current annotation methodologies are mostly performed manually and statically. For example, when domain knowledge is required, current systems manually assign the domain experts to the unlabeled data. Strong dependency among annotators, unlabeled data and available labels tends to fixate assignment of unlabeled data to a particular domain expert. For example, for medical content, a physician or the like domain expert is selected. However, if the medical content is placed with a wrong domain expert (e.g., the content with some engineering domain content is placed with an engineer), no value may be extracted as that engineer expert may not have the expertise to label the medical content. In addition, if approximate or non-accurate labels are presented to an annotator, results may be less valuable. Current methodologies require pre-defined labels and known annotators' expertise for a known set of data before the labeling could start.

BRIEF SUMMARY

The summary of the disclosure is given to aid understanding of a computer system, method and technique disclosed herein. It should be understood that various aspects and features of the disclosure may advantageously be used separately in some instances, or in combination with other aspects and features of the disclosure in other instances. Accordingly, variations and modifications may be made to the system and/or its method of operation to achieve different effects.

A computer-implemented method and system of improving, for example, by machine learning, annotation quality on diverse and/or multi-disciplinary content, for example, for machine learning consumption, can be provided.

A computer-implemented method, in an aspect, can include determining a probable group of labels associated with content by a first machine learning model. The method can also include, using a set of labels and relationships among the set of labels maintained dynamically, selecting by a second machine learning model, an annotator having subject matter expertise associated with the probable group of labels. The method can also include retraining the first machine learning model and the second machine learning model based on annotations performed on the content by the annotator as feedback.

A system, in one aspect, can include a processor and a memory device coupled with the processor. The processor can be configured to dynamically associate content to an annotator based on machine learning of annotator expertise and dynamically maintaining a set of labels and relationships among the labels.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 8 illustrates a set of functional abstraction layers provided by cloud computing environment in one embodiment of the present disclosure.

DETAILED DESCRIPTION

Figure 1:
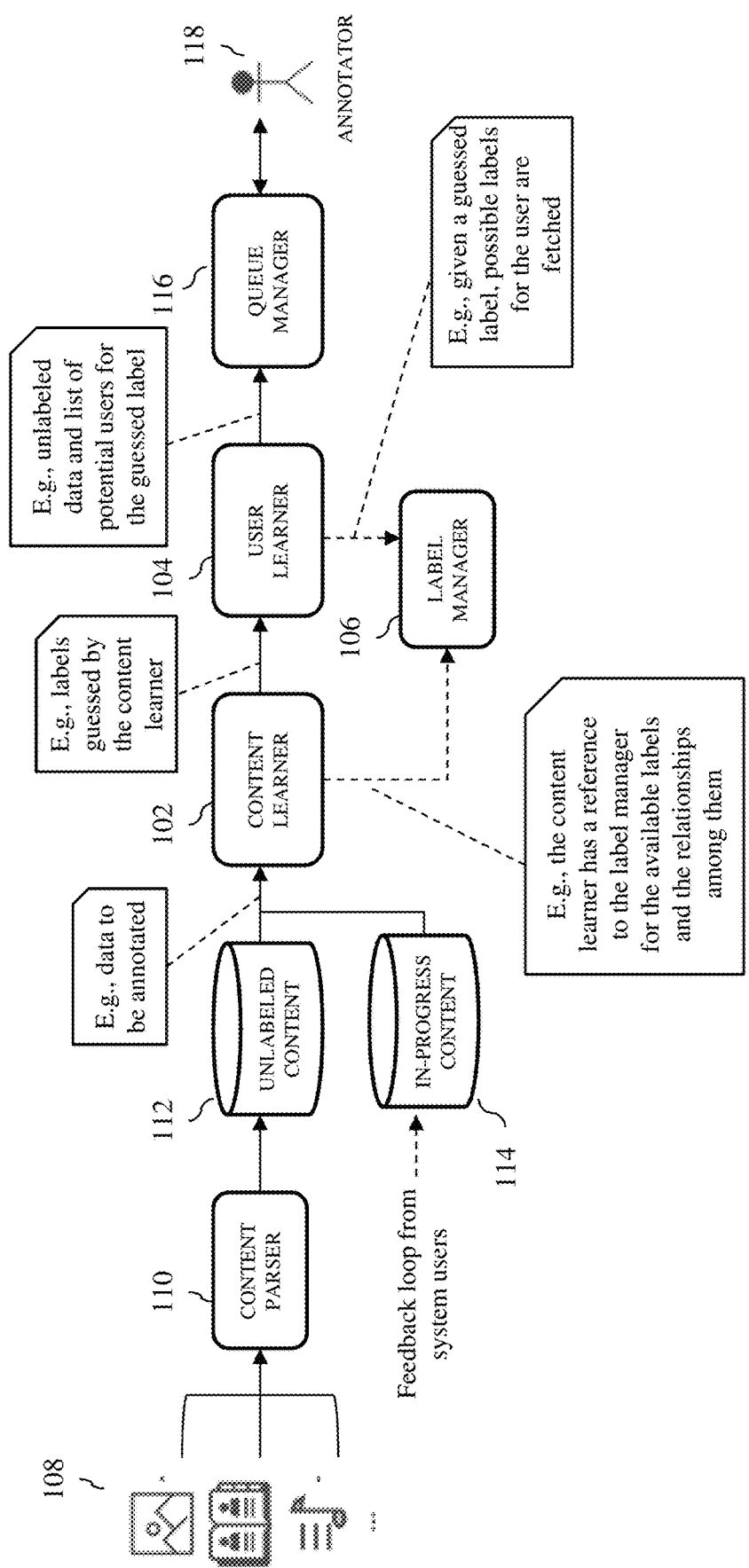
FIG. 1 is a diagram illustrating components of a system in an embodiment.

Systems and methods are provided which can automatically assign annotators for a given content, for example, any given content such as text, audio, images, and/or others.

In an embodiment, a system and/or method may maximize the efficiency of performing annotations of multi-disciplinary content. In an aspect, categorizing content first per domain (for example, first understanding which content is medically related, then providing that content to physicians or the like experts) need not be mandatory. In an embodiment, the system and/or method can learn the know-how of the annotators, dynamically expanding or contracting the annotators' areas of expertise and values. The system and/or method in an embodiment allow for focusing on a subset of large multi-disciplinary datasets. For instance, if a company would like a focus on oncology related data, the system and/or method may provide a way to slice only the relevant data with more detailed labels. For example, the system and/or method may discard content not related to the particular domain or topic, e.g., "oncology", and use domain-specific labels related to oncology, e.g., "cardiovascular disease", "skin cancer", etc. In an embodiment, the system and/or method may simplify annotator tasks by selecting the unlabeled content which best match an annotator's expertise; suggest the most relevant labels for the content; and enable annotators to pick other labels or define their own labels.

In one or more embodiment, the systems and methods can be implemented on one or more processors such as computer processors and hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an aspect, a system can be a loosely supervised annotation system. For example, the system builds and maintains relationships among labels without strictly defining them. The system is able to receive as input any label and provide in output a combination of filtered data based on area-of-interest (e.g., return all on oncology data) and granularity of the labels (e.g., names of diseases like "Hashimoto thyroiditis", "Medullary thyroid cancer", "Anaplastic thyroid cancer" versus "Thyroid cancer"). In an embodiment, one would not need to re-annotate the same data because the system automatically annotates the data in fine granularity. Rather, in an embodiment, one would only change a query per use-case.

FIG. 1 is a diagram illustrating components of a system in an embodiment. The components shown include computer-implemented components, for instance, implemented and/or run on one or more hardware processors, or coupled with one or more hardware processors. A system in an embodiment dynamically associates unlabeled or partially labeled content to annotators, while learning on annotator's expertise and dynamically maintaining the set of labels and their relationship. The components shown in FIG. 1 can interact or communicate with one another to achieve various effects disclosed herein, and for example, such communications can be bi-directional.

Content can include any of text, images, audio, video, media or any data format that can be consumed in a machine learning algorithm. A content learner component 102 of the system performs machine learning of the content, e.g., pool of data. The content learner component 102 can train on labeled data and return a probable group of labels for given content. Machine learning or machine learning model associated with the content learner component 102 or content learner can also be referred to as a first machine learning model.

A user learner component 104 of the system learns annotator expertise based on collected annotations. The user learner component 104 learns from annotator behavior and returns the best suited annotators for a given group of labels. For example, the user learner component 104 may use a consensus strategy to dynamically establish a user area of expertise. As another example, the user learner component 104 may use a scoring system describing user reliability. Yet as another example, the user learner component 104 may use an ontology and/or taxonomy to detect the area for manually picked labels. Annotator behavior, which the user learner component 104 may use to learn to select one or more annotators for annotating content, may include information such as, but not limited to, the amount of time an annotator takes in labeling the content or completing a given annotation task. Machine learning or machine learning model associated with the user learner component 104 or user learner can also be referred to as a second machine learning model. In an embodiment, a user learner component 104 may include or access a database or like storing or having information associated with a set of annotators.

A label manager component 106 of the system keeps track of available labels (e.g., all available labels) and their relationships. The label manager component 106 learns new relationships among labels and new user-provided labels connecting those new user-provided labels to existing ones. Machine learning or machine learning model associated with the label manager component 106 or label manager can also be referred to as a third machine learning model.

The content learner component 102, the user learner component 104 and the label manager component 106 can work in synergy to pick the best annotators for an unlabeled (no label available) or partially labeled (e.g., quorum of annotations not reached) content; keep the available labels and their relationship updated; improve knowledge on each annotator expertise and which labels an annotator can best serve; return the most probable label or set of labels (optionally with their relationship) given any unlabeled content; and/or improve accuracy of automatic or semi-automatic content labeling for machine learning consumption over time.

In an aspect, a processing of the system may include flow from the system to a user (e.g., annotator) in selecting data and assigning the data to an annotator. In another aspect, a processing of the system may include a flow from the user (e.g., annotator) back to the system, when an assigned annotation is completed. In an embodiment of an implementation, the flows can be held together through a queue or queue management system. For instance, data to be annotated is put in user's queues and users consume from the queue. Having asynchronous communications can allow for a scalable system and simplify the implementation. However, using a queue is not a requirement of an implementation. Other asynchronous or synchronous solutions can be adopted. For example, in another embodiment, content data-to-annotator assignment can be performed at runtime directly. For instance, annotations can be directly sent to the annotators currently online, without using queues.

An example flow from the system to a user in an embodiment is described with reference to FIG. 1. Content data 108 can be any data used in labeling, for example, which can include text data, image data, video data, and/or others. The content 108 can be in any domain. For example, the content 108 received by the system can be in any domain, and need not be pre-defined. A content parser 110 parses the content data 108, for example, received by the system, to prepare the data for labeling or annotating, for example, for consumption by the content learner 102, which can include a machine learning model trained to classify or predict labels. For example, the content data 108 can be raw data, which the content parser 110 may parse to perform data cleaning, for example, formatting and organizing, handling missing or incomplete data, standardizing, correcting errors, removing unwanted data, and/or other data cleaning and/or preprocessing. As another example, the content parser 110 may convert external data into a format that one or more of the processors of the system can work with internally. For instance, the content parser 110 may convert data such as audio into text with which one or more machine learning algorithms can work, convert data such as complex portable document format (pdf) into simple text, and/or others. The content parser 110 may convert any type of external data (e.g., video, image, text) into data consumed by one or more processors of the system, for example, data into digital form.

The content parser 102 can store the parsed and cleaned data as unlabeled content 112 in one or more storage or memory devices. The unlabeled content 112 includes data which needs to be annotated.

The content learner 102 can include a machine learning model such as an artificial neural network (also referred to as a neural network) trained to classify the unlabeled content 112. Other machine learning techniques can be used. The content learner 102 is trained using labeled data to perform its classification of given unlabeled data. For instance, the content learner 102 can be pre-trained and run with the unlabeled content 112 to classify that content. The content learner 102, for example, estimates or guesses (by its classification) possible labels for a given content 112. The guessed labels, for example, can be used to select appropriate annotators.

In an embodiment, the content learner 102 can also dynamically re-train itself, based on labeled data such as in-progress content 114, annotated by one or more annotators (e.g., selected based on the guessed labels). For example, the in-progress content 114 can be used as feedback to improve the machine learning model of the content learner 102. For example, the in-progress content 114 can include content which the selected annotator labeled, but needing further or additional annotations, for example, based on consensus. Further, the content learner 102 can re-classify the in-progress content 114 based on the feedback.

The user learner 104 uses the probable or guessed labels estimated by the content learner 102 to select an annotator to annotate a given content, e.g., the unlabeled content 112. For example, the user learner 104 picks one or more annotators determined to best be able to label that content, for example, those annotators determined to have expertise in the subject matter of the content. The user learner 104 can include machine learning, e.g., a machine learning model such as a neural network, which learns the expertise of each annotator. For example, a task of the user learner 104 is to pick one or more annotators or users determined to be best to perform a given task of annotation. The user learner 104 learns the expertise of each annotator and is able to associate one or more labels to an annotator with a given confidence.

The user learner 104 in an embodiment may place the unlabeled data with associated and/or predicted labels (e.g., estimated by the content learner 102 and/or retrieved from the label manager 106) and selected one or more annotators in a queue, for example, for an annotator 118 to handle. For example, in an embodiment, the user learner 104 may provide the unlabeled data with associated and/or predicted labels and selected one or more annotators to a queue manager component 116 to place in a queue for assigning to one or more annotators to handle. For example, an annotator 118 may request to perform an annotation or labeling task, and the queue manager 116 may pop or retrieve a queued task from the annotator queue. In an embodiment, one or more tasks can be queued or stored in an annotator's queue, for instance, regardless of whether an annotator is online or offline. When an annotator comes online, for example, is ready to perform a task, a queued annotation task can be popped or retrieved from the queue. In another embodiment, the user learner 104 in an embodiment may directly assign the unlabeled content (e.g., with its guesses labels) to one or more selected annotators. Selected one or more annotators may work on their assigned content, for example, annotating the content.

The user learner 104 also can include a machine learning model such as a neural network trained to output annotator selections given the input of probable or guessed labels. Other machine learning technologies can be used. The machine learning model of the user learner 104 can also dynamically re-train itself based on feedback associated with the selected annotators. For example, based on one or more completed annotations by selected annotators, both the content learner 102 and the user learner 104 can use this feedback information to improve their machine learning models. In an embodiment, the user learner 104 learns the user expertise with time and may further dynamically associate user to expertise. For example, the user learner 104 can discover and learn that a user has expertise in other fields. For example, the user learner 104 may change or update dynamically the user's area of expertise.

In an embodiment, the content learner 102 and the user learner 104 may have different models, for example, different machine learning algorithms. The different machine learning models or algorithms can work on available labels. In an embodiment, the label manager 106, for example, can act as the glue or an interconnecting component with respect to available labels for the content learner 102 and the user learner 104. For example, the label manager 106 may include a plurality of labels such as a hierarchy or ontology of labels and relationships among labels. The user learner 104, in an embodiment, given a guessed label, can fetch from the label manager 106 possible additional labels associated with this guessed label, and provide the possible additional labels also to the annotator 118, for example, via the queue manager 116.

For example, the label manager 106 may manage labels, for example, include labels and relationship among the labels, which can be updated over time. The labels that the label manager 106 manages can be dynamic, for example, new labels can be added (e.g., by users or annotators) and/or labels can be updated. For example, an annotator may tag a text referring to potatoes as "spud", for the first time (e.g., "spud" label does not yet exist in the pool of labels). The label manager 106 may recognize that the same or similar text is tagged as "potato" (e.g., previously or by another annotator). Consequently, the label manager 106 learns that the new label "spud" is related to "potato." The label manager 106 can include machine learning or one or more machine learning models. The label manager 106 can also dynamically re-train itself based on feedback, for example, labels annotated by annotators.

Machine learning or machine learning based models described herein, for example, machine learning in the content learner 102, user learner 104 and label manager 106 may use a wide variety of combinations of techniques, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata.

In an embodiment, the content learner 102 can be implemented as a support vector machine (SVM) for text classification. Text or content can be transformed or converted into feature vectors and input to the SVM for text classification. For example, the SVM learns a decision boundary or hyperplane that separates different output classes. For example, the SVM may learn a decision boundary, which maximizes the margins of classification outputs (labels), e.g., maximizes the distance between data points (feature vectors associated with text or content) of each label. Another machine learning algorithm such as a neural network classifier can be implemented. The labels used for guessing or classifying may be retrieved from the label manager 106. Multiple instance of machine learning may be used, for example, to partition the system. In an embodiment, the output of the content learner 102 is an approximation, which is used to select from the user pool (annotator pool) and to provide an initial selection of labels (e.g., retrieved from the label manager 106). In an embodiment, those estimated or guessed labels need not be used in final annotation by a selected annotator.

In an embodiment the user learner 104 can be implemented using a knowledge graph to store the user (annotator) expertise and keep the data updated. For example, every time the user annotates content with a label, the user learner 104 may use the label to reinforce the user's graph (e.g. by adding weight to an edge) or to create new connection. The knowledge graph can include user nodes and label nodes and edges connecting label nodes to user nodes. Nodes and edges can be implemented in memory, for example, allocated or stored on a memory or storage device. Relationship of labels can be obtained or received from the label manager 106. The user learner 104 can select one or more annotator nodes with strong relationship (edge weights having high values or meeting a threshold value) to label nodes representing the guessed or estimated label. Another implementation may use machine learning such as a recommender system, reinforcement learning, collaborative filtering and/ or neural networks. For instance, based on learning the input-output relationship of labels to annotator characteristics, the user learner 104 can recommend or predict which annotators to assign for a given content classified with probable or guessed labels. The user learner 104, in an embodiment, learns user expertise over time, for example, based on specific labels they are able to select or identify.

In an embodiment, the label manager 106 can be implemented using a knowledge graph system. For example, the label manager 106 can be bootstrapped using one or more of, or one or more combinations of, ontologies, taxonomies, and language models, and/or others. Labels can be described by nodes in the knowledge graph, and connection can be exploited to use more general terms. The knowledge graph includes nodes representing labels and edges representing relationships connecting the nodes. In an embodiment, the edges can have weights, which can represent the strength or degree of relationships. In a simplified example, nodes can be structured in a hierarchy and the level in the hierarchy gives the granularity. For example, labels can be represented in levels of granularity in a hierarchy of nodes. An example of a relationship maintained in the label manager 106 can include "chronic heart failure" label node connected by an edge to "chronic condition" label node, for example, representing a hierarchical relationship or association, for example, a "chronic heart failure" being a specific case of "chronic condition". Another example can be a "cardiovascular disease" node connected to, or having association with a "disease" node. As another example, synonyms of labels can be connected as having relationships. The label manager 106, in an embodiment, learns label relationships over time.

In an embodiment, labels are represented in a hierarchy and can be maintained by the label manager 106. When the annotator (e.g., 118) is assigned a content to annotate, the annotator may be given a selection of labels. By way of example, consider an unlabeled content "digital health, the rise of Alkhurma Hemorrhagic Fever (AHF)." If the annotator is an engineer (e.g., the user learner 104 selected an annotator having expertise in engineering because the term AHF is also relevant in engineering field), the system may prompt the annotator with labels such as "Digital signal", "Analog signal", "Active Harmonic Filter" based on the hierarchy of labels associated with AHF in engineering aspect and "Healthcare". If, for example, the user learner 104 selected an annotator having expertise in healthcare or medical field (e.g., based on the content learner 102 having classified the content to be in medical field), the system may prompt the annotator with labels such as "Alkhurma hemorrhagic fever (AHF)", "Alkhurma hemorrhagic fever virus (AHFV)", "Flavivirus", "Digital Healthcare," based on the hierarchy of labels maintained by the label manager 106. If the engineer picks "Healthcare", such selection reinforces the system to pick healthcare or medical field subject matter experts as annotators for similar content. If one or more healthcare or medical field subject matter experts also select "Healthcare" then the user learner 104 may use the selection of healthcare/medical field subject matter experts as annotators for such content (e.g., and not use engineers since all annotators selected "Healthcare").

In an aspect, the system allows for using a given content for multiple domains, for example, without having repeat labeling process for every domain. For example, at an initial stage, one may want the given content to be labeled for a general domain, for example, diseases. By using the hierarchy of labels, additional labels can be aggregated at a higher level. For instance, labels having hierarchical relationship with the general domain labels can be aggregated. At a later stage, one may decide to explore a specific domain, for example, the area of diseases. The system already has all the labels available, including the specific domain labels (e.g., by way of the hierarchy of labels). A filter can be employed to pick the specific subset of the full data (labels) pertaining to the desired specific domain or topic. In this way, for example, the content need not be passed to multiple different annotators for re-labeling for a different domain (or a specific domain) or different topic.

Figure 2:
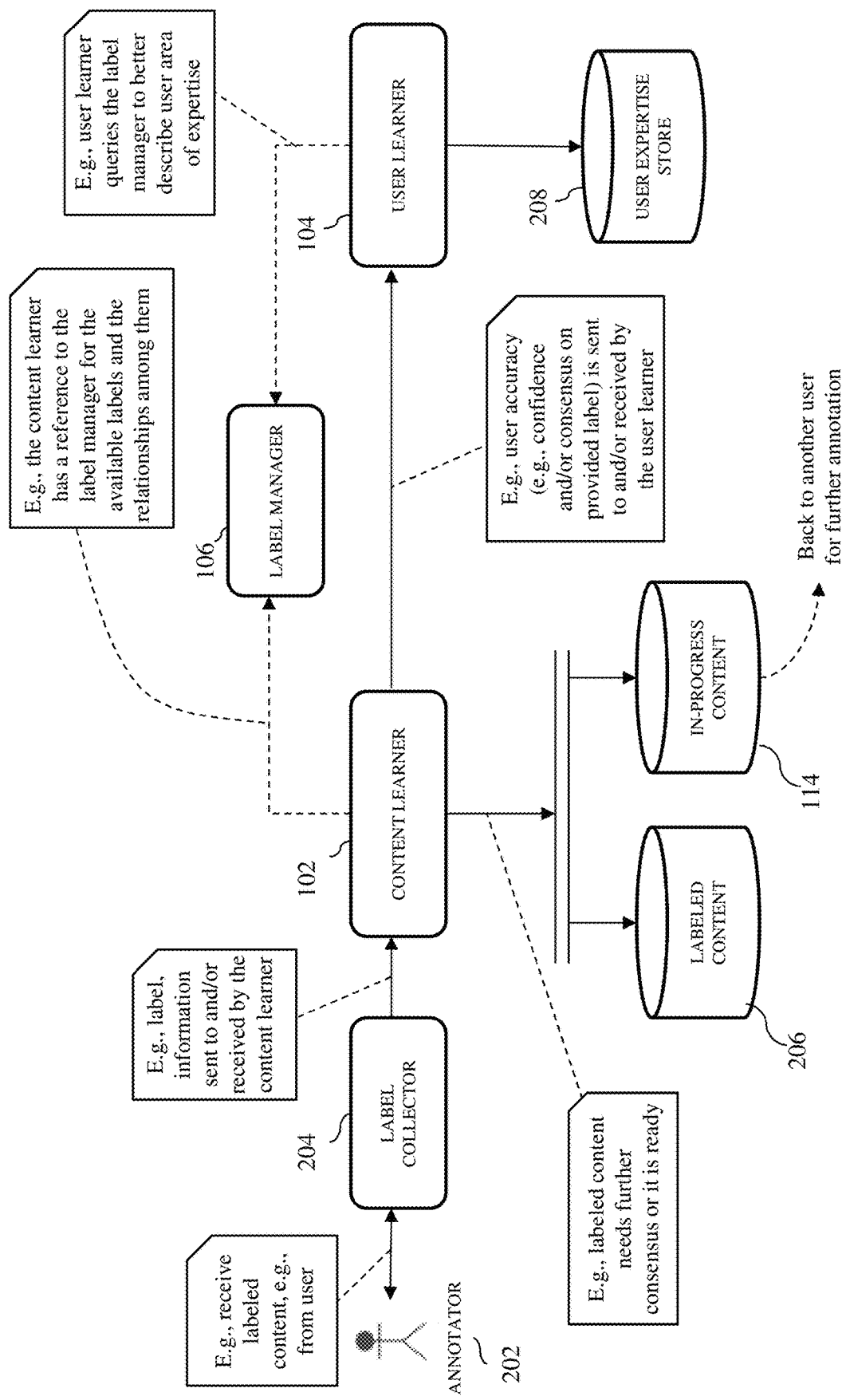
FIG. 2 is another diagram illustrating components of a system in an embodiment.

FIG. 2 is another diagram illustrating components of a system in an embodiment. The components shown include computer-implemented components, for instance, implemented and/or run on one or more hardware processors, or coupled with one or more hardware processors. The components shown in FIG. 2 can interact or communicate with one another to achieve various effects disclosed herein, and for example, such communications can be bi-directional. A process flow from an annotator (also referred to as a user) to the system can be shown in FIG. 2. An annotator 202 sends a labeled content to a label collector 204. The label and/or context information (e.g., metadata) can be sent to the content learner 102. The context information or metadata can include information such as how long it took the annotator to annotate, the annotator's expertise. The user learner 104 may also receive such information (e.g., information related to annotator labeled content), which can be useful for the user learner 104 to use to learn. For instance, the user learner 104 may receive such information (e.g., information related to annotator labeled content) from one or more components of the system and/or retrieve such information from a memory or storage device. In an embodiment, for example, the user learner 104 may learn the annotator expertise based on one or more of: collected annotations of the annotator with associated metadata (such as time to reply, focus on the application, other task currently being in progress, and/or others), collected annotations from other annotators, area of expertise of similar annotators. Similarity of other annotators to the annotator can be determined, for example, based on a similarity threshold or a degree of similarity of domains in which both annotators have expertise, which may be predefined.

The labeled content can be determined as being ready or needing further clarification, for example, in-progress. The labeled content can be determined to be ready and can be stored as labeled content 206 in one or more storage or memory devices. For example, one or more processors of the system can take a consensus from a plurality of experts or annotators to determine whether the labeled content is ready. If the content is ready, it is placed or stored as labeled content 206. The labeled content can be determined as in-progress content 114, for example, for further annotation or re-labeling, for example, based on consensus. The in-progress content 114 can be sent to another annotator for further annotation. For instance, consensus mechanism can be used to validate an annotation. Such consensus mechanism can be performed automatically by the system. For example, a consensus among annotators can inform whether the labeled content is ready or needs further annotation. By way of example, if three annotators annotate content with the same label, it can be determined that a consensus is reached and the labeled content is ready. If, however, those three different annotators provide different labels for the same content, it may be determined that the content needs further clarification, for example, need more annotators (e.g., different annotators) to annotate the content. In this scenario, the labeled content can be determined to be in-progress.

One or more processors of the system can determine, for example, via a consensus taken from a plurality of experts or scoring mechanism, the accuracy of the selected annotator, for example, whether the annotator 202 selected had correct subject matter expertise for labeling the content. Such user accuracy (e.g., confidence or consensus on provided label) can be sent to the user learner 104. The user learner 104 may use the information (e.g., consensus, reliability of an annotator over topic) as feedback to re-train itself or to re-learn to better predict label and annotator relationships. Such feedback or learned knowledge can be stored in a user expertise store 208, on one or more storage or memory devices.

The content learner 102 has a reference to the label manager 106 for the available labels and the relationships among them. For example, the content learner 102 can access or communicate with the label manager 106 to retrieve available labels and their relationships. The user learner 104 can query the label manager 106 to better describe user area of expertise, for example, associating an annotator with additional labels. In an embodiment, the label manager 106 can also learn from the labeled content 106 and/or in-progress content 114, for example, updating and/or possibly adding new labels (e.g., label nodes) to its knowledge graph.

Figure 3:
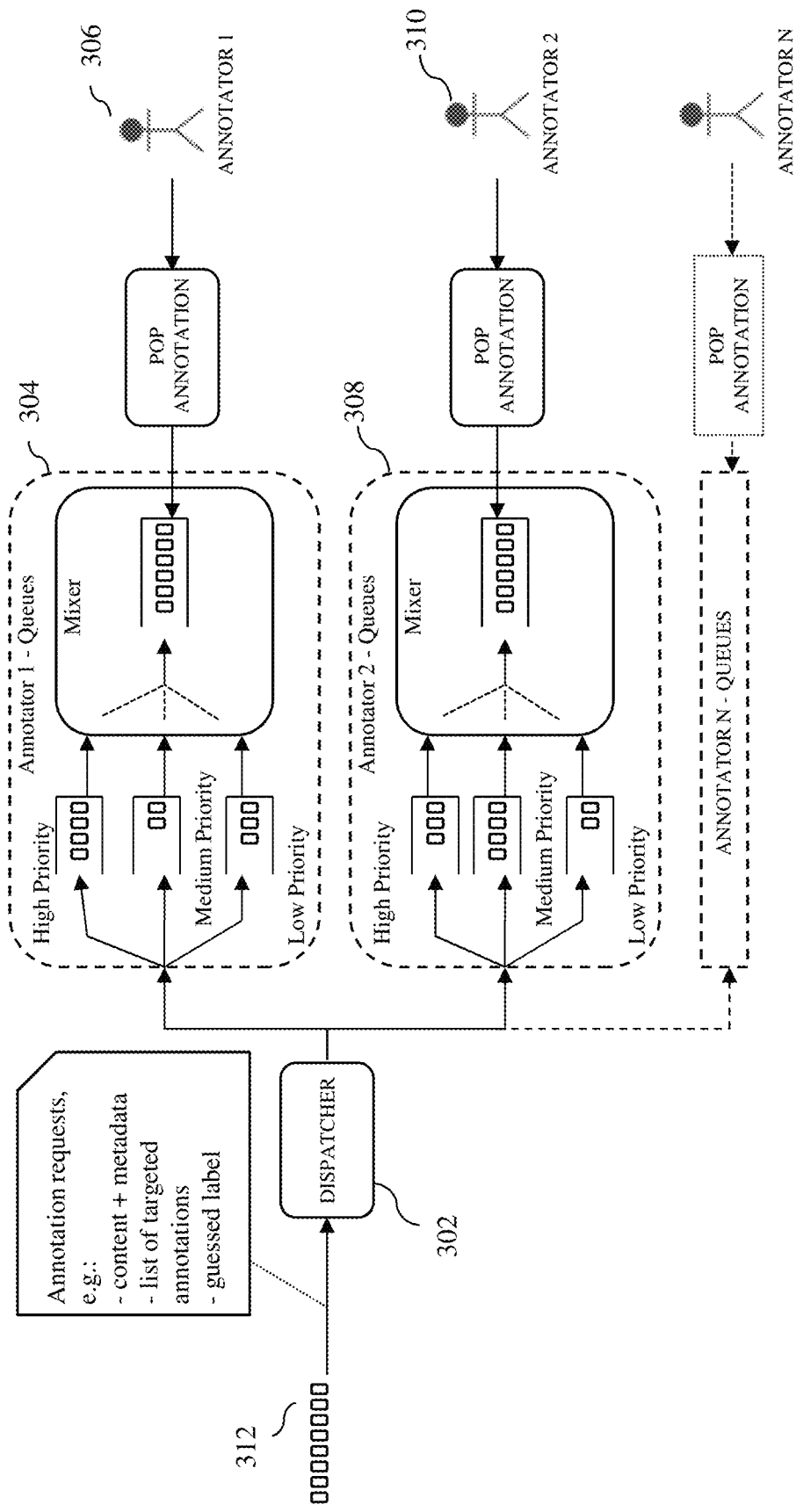
FIG. 3 is a diagram illustrating assigning of annotations to annotators in an embodiment.

FIG. 3 is a diagram illustrating assigning or dispatching of annotations to annotators in an embodiment. This embodiment illustrates an example of an asynchronous communication or assignment method. For example, the queue manager described with reference to FIG. 1 may perform such assigning. The process can be an asynchronous process. The components shown include computer-implemented components, for instance, implemented and/or run on one or more hardware processors and/or one or more memory devices. A dispatcher 302 receives annotations requests 312, which may include content (e.g., unlabeled content) and its metadata, list of targeted annotators (e.g., determined by the user learner), and guessed labels (e.g., classified by the content learner). Additional labels having relationships with the guessed labels (e.g., from the label manager) can be provided with the annotations requests. In an embodiment, the labels presented to the annotator can cover all the areas, for example, with focus on the guessed part. Guessed labels can be presented to the annotator as part of the possible labels, and a user interface, based on confidence levels associated with presented labels, may indicate labels which may be relevant or degrees of relevancy, for example, by graphical notations such as highlighting, underlining, and/or other user interface indications.

In an embodiment, annotations requests 312 can be stored on a memory device or a storage device, for example, by a user learner component (e.g., 104 in FIG. 1), from which the dispatcher 302 may retrieve. In another embodiment, annotations requests 312 can be directly received by the dispatcher 302, for example, from such a component.

The dispatcher 302 in an embodiment dispatches the annotations requests to annotator queues. For example, the dispatcher 302 takes an annotation request and assigns that request to a target annotator specified in the request by queuing the request in a queue 304 allocated for the target annotator 306. Similarly, the dispatcher 302 takes an annotation request and assigns that request to a target annotator specified in the request by queuing the request in a queue 308 allocated for the target annotator 310. Each target annotator can have multiple annotation requests, which may be grouped in priority order. A mixer may order the requests according to priority or another order for the annotators to retrieve from the queue.

A queue 304, for example, includes a memory space allocated for an annotator. For example, the queue 304 can be an in-memory queue. In an embodiment, multiple queues can be allocated for respective multiple annotators, for example, a queue corresponding to an annotator. Other queuing mechanism can be implemented. For example, a queue can be allocated to a group of annotators sharing expertise or knowledge, or having the same or similar expertise knowledge. A user interface or a graphical user interface can be provided for allowing one or more annotator to access the queue and retrieve the annotation request for labeling.

The system and/or method in one or more embodiments allow for a dynamic association among data, annotators and available associations. The system, for example, can be provided as a common platform for hybrid data and to automate artificial intelligence (AI), allowing for self-adapting to diverse data and multi-disciplinary annotator pools. In an aspect, the system allows for building robust AI models with trusted data, for example, with the system's ability to track annotators' behavior and trace their annotations. In one or more embodiments, the system provides a machine learning solution to such robust AI models and trusted data.

In an aspect, the system disclosed herein may be able to autonomously learn user or annotator's expertise area and be able to identify that area with more specificity as the system learns. For example, the system may initially not have specific knowledge about an annotator's domain of expertise, then as the annotator completes annotation tasks, the system may learn one or more specific domains of expertise that annotator has. By way of example, consider that initially the system suggests only the three macro known areas, healthcare, engineering and transportation, to the annotator. Since the system does not know about the annotator, initially, the system does not add any domain expertise. As the annotator starts to annotate, the system learns that the annotator is more confident, faster and/or more accurate in the engineering domain, and so the system starts to provide the annotator with mostly engineering annotation requests, and engineering tailored labels. In addition, the system learns that among all the engineering specialization, computer engineering is the one the annotator is most confident with. The system may iterate the logic multiple times, and result in knowing the annotator expertise, which is JAVA, thus the system may present annotations like "Java Microservices" and "Java Threading" to the annotator. In an embodiment, over time, in the perspective of the annotator, this new annotator not only sees the content more and more tailored to the annotator's domain expertise, but also that the list of labels to pick from is more tailored to the annotator's domain expertise.

In one or more embodiment, the system, for example, allows for adding new labels and employing or selecting a dynamic set of annotators. The system also enables presenting the annotator with content which is relevant to that annotator. In an aspect, labels can dynamically change based on content and annotator. The system can have a dynamic set of labels, with labels having relationships, and can enable multi-domain annotations. The system can be a general-purpose multi-domain annotator tool.

In an aspect, annotations or labels can be dynamically selected, e.g., different annotations can be shown to different annotators. In another aspect, a unified interface to different annotators can be presented, for example, with the same or similar layout for surveys. In yet another aspect, the system can capture domains of expertise and connect an annotator to the domains. In another aspect, the system can allow for sharing of annotators' knowledge between pools of annotators, including for example, within the same project where a project may have its own pool of annotators (e.g., oncology experts, dentists, social care workers).

In one or more embodiments, for example, as described herein, the system can include one or more processors configured to dynamically associate unlabeled or partially labeled content to annotators, for example, while learning on annotators' expertise and dynamically maintaining the set of labels and their relationships. For example, a set of labels and their relationships which change over time can be maintained. The content can include one or more of a text, image, audio, video, media or any data format that can be consumed in a machine learning algorithm. For example, a content learner component can be configured to perform machine learning of the content, where the content learner component trains on labeled data and returns a probable group of labels for it. A user learner component can be configured to learn annotator expertise based on the collected annotations, where the user learner component learns from annotator behavior and returns the best suited annotators for a given group of labels. A consensus strategy can be used to dynamically establish a user area of expertise, a scoring system can be used which describes user reliability, and/or an ontology and/or taxonomy can be used to detect the area for manually picked labels. For example, labels in the ontology and/or taxonomy relating to a user-selected label can be used to detect or determine area of user expertise. A label manager component can be configured to keep track of all available labels and their relationships, where the label manager component learns new relationships among labels and new user-provided labels, where the label manager can connect the new user-provided labels to existing ones. The content learner component, the user learner component, and the label manager component can work in synergy to pick the best annotators for an unlabeled or partially labeled content; keep the available labels and their relationship updated; improve knowledge on each user expertise and which labels are best for the user; return the most probable label or set of labels given any unlabeled content; and improve accuracy of labeling content over time.

Figure 4:
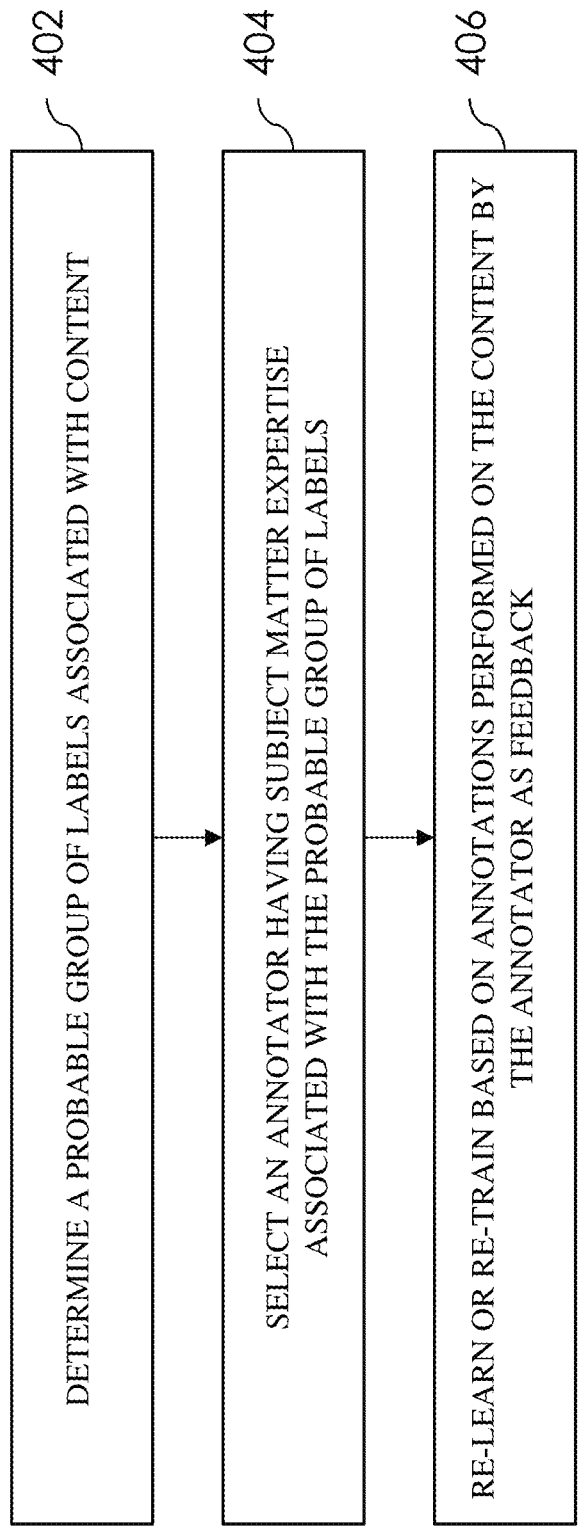
FIG. 4 is a flow diagram illustrating a method in an embodiment.

FIG. 4 is a flow diagram illustrating a method in an embodiment. The method can be performed by or run on one or more hardware processors. At 402, a probable group of labels associated with content can be determined. For example, content for labeling can be received or obtained and a first machine learning model trained to output one or more labels for given content can determine the probable group. For example, the first machine learning model can be a machine learning model of the content learner described above with reference to FIGS. 1 and 2. The content can include at least one of text, images, audio, video and media data, and/or any data in any format suitable for machine learning consumption. The content can be unlabeled or partially labeled data.

At 404, a set of labels and relationships among the set of labels maintained dynamically can be used in selecting an annotator having subject matter expertise associated with the probable group of labels. A second machine learning model trained to associate labels to annotators with a given confidence can select an annotator. For example, the second machine learning model can be a machine learning model of the user learner described above with reference to FIGS. 1 and 2.

At 406, the first machine learning model and the second machine learning model can be retrained based on annotations performed on the content by the annotator as feedback. For example, the second machine learning model can be trained to associate labels to annotators with a given confidence based on at least one of consensus validating the annotations performed on the content by the annotator, scoring of reliability associated with the annotator based on the annotations performed on the content by the annotator, and ontology associated with the set of labels and the relationships among the set of labels maintained dynamically.

A third machine learning model dynamically maintains the set of labels and the relationships among the set of labels. The third machine learning model can be a machine learning model of the label manager described above with reference to FIGS. 1 and 2.

The method can also include placing an annotation request associated with the content in an in-memory queue associated with the annotator. The annotator may retrieve the annotation request in an asynchronous manner.

Figure 5:
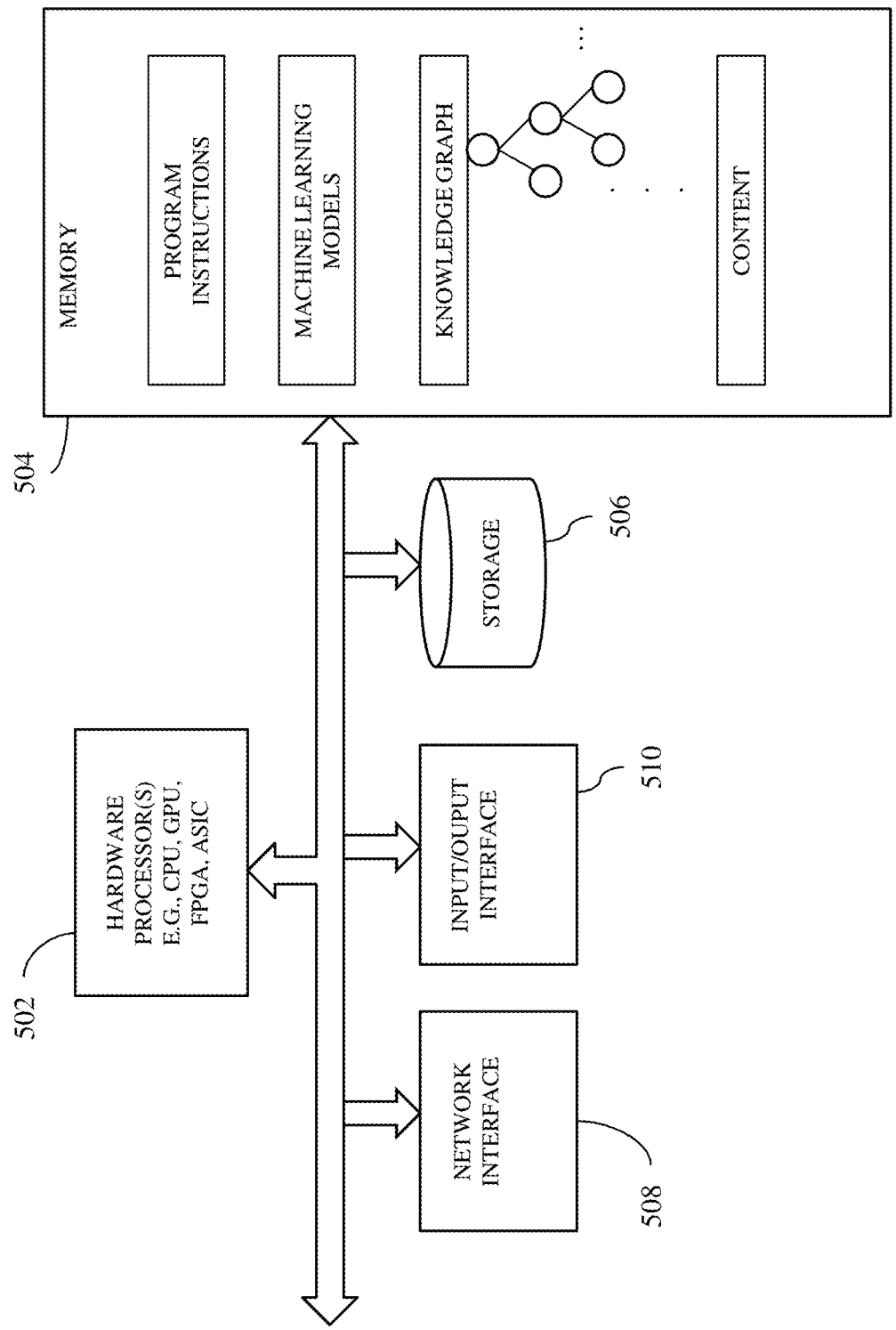
FIG. 5 is a diagram showing components of a system in one embodiment that can perform dynamic annotations.

FIG. 5 is a diagram showing components of a system in one embodiment that can perform dynamic annotations. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and perform online machine learning. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input comprising data or content, for example, for annotating or labeling. For instance, at least one hardware processor 502 may dynamically associate content to an annotator based on machine learning of annotator expertise and dynamically maintaining a set of labels and relationships among the labels. In one aspect, input data may be stored in a storage device 506 or received via a network interface 508 from a remote device, and may be temporarily loaded into a memory device 504 for associating annotators to the content for labeling. Various machine learning models disclosed herein may be stored on a memory device 504, for example, for running by one or more hardware processors 502. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
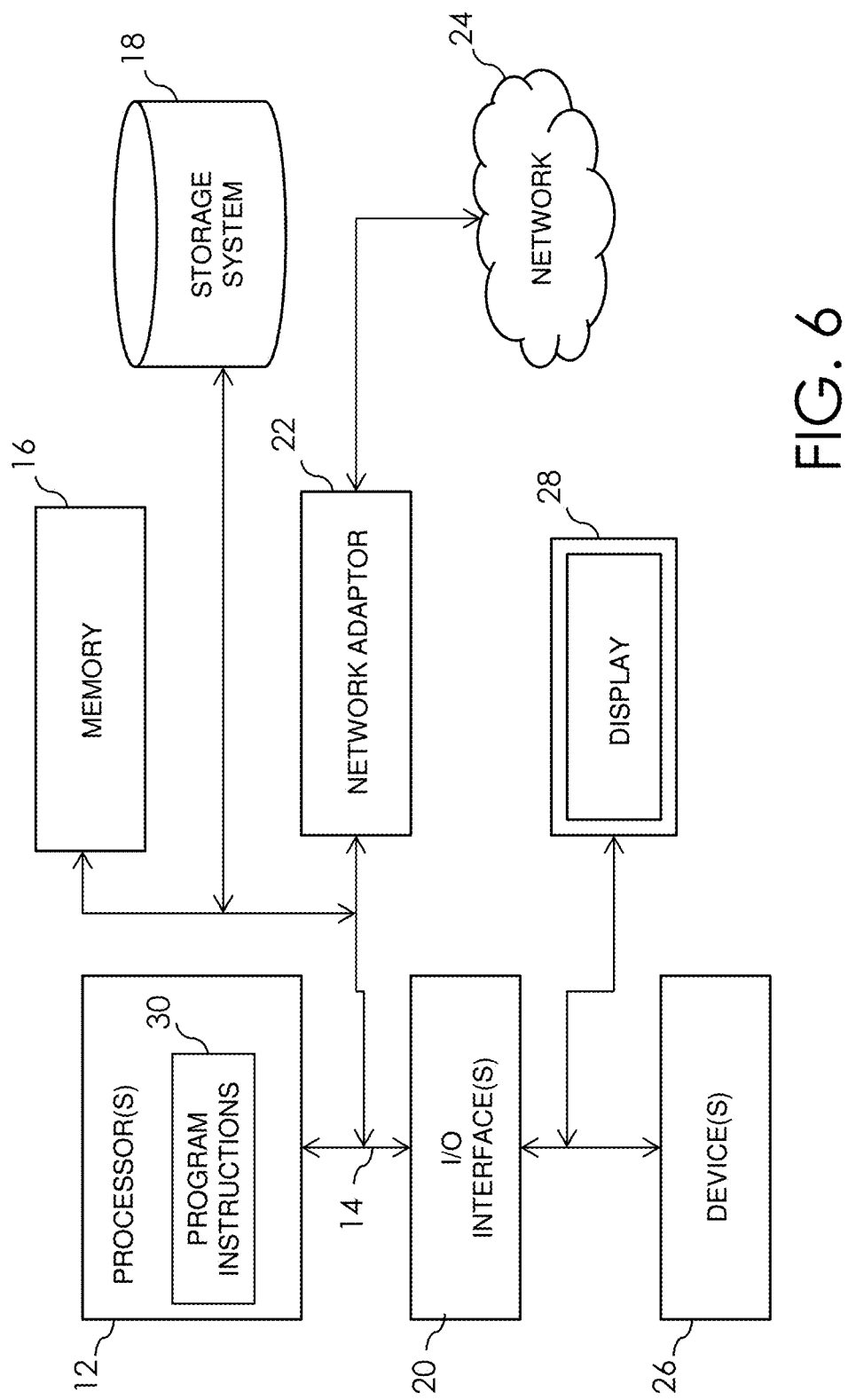
FIG. 6 illustrates a schematic of an example computer or processing system that may implement a system in an embodiment.

FIG. 6 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
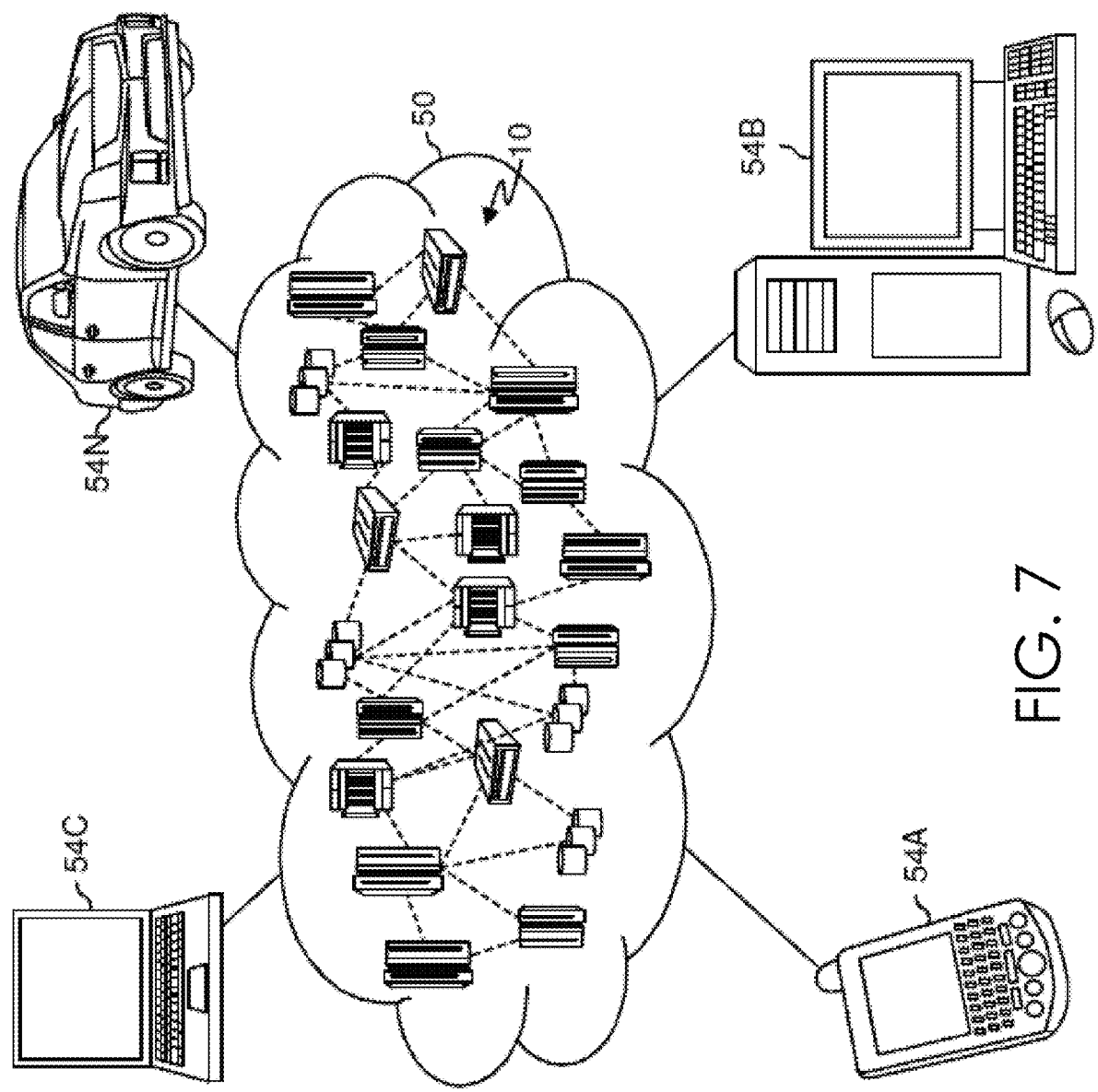
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic annotation processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a processor;
a memory device coupled with the processor;
the processor configured to dynamically and automatically associate content to an annotator based on machine learning of annotator expertise and dynamically maintain a set of labels and relationships among the labels;
a first machine learning model trained to output a probable set of labels associated with the content;
a second machine learning model configured to determine an annotator having expertise in an area associated with the probable set of labels, the second machine learning model configured to learn annotator expertise at least based on annotator behavior, the annotator behavior including at least an amount of time a given annotator takes in labeling a given content, the second machine learning model further configured to discover and learn that the annotator has expertise in other fields than a field associated with the probable set of labels, and update dynamically the annotator's area of expertise; and
a third machine learning model configured to maintain the set of labels and relationships among the labels, and further configured to learn new relationships among the labels and new labels responsive to receiving annotator tagged new labels associated the content,
wherein the processor is configured to run the first machine learning model using the content as input to determine the probable set of labels associated with the content, automatically run the second machine learning model using the probable set of labels as input to automatically determine the annotator, automatically queue the content in a queue on the memory device associated with the annotator, run the third machine learning model and fetch from the third machine learning model additional labels associated with the probable set of labels and also associated with a field of expertise of the annotator, and provide the additional labels with the content to the queue associated with the annotator, the content that is labeled by the annotator being used as part of a training set for supervised machine learning, the content that is labeled by the annotator being usable for multiple domains without having to repeat a labeling process of the content for every domain of the multiple domains by using, for the supervised machine learning in different domains of the multiple domains, aggregated labels having hierarchical relationships with annotator provided labels of the content.

2. The system of claim 1, wherein the content includes at least one of text, images, audio, video and media data.

3. The system of claim 1, wherein the first machine learning model trains and uses annotations performed by the annotator as feedback to retrain itself.

4. The system of claim 1, wherein the second machine learning model learns annotator expertise based on at least one of: collected annotations of the annotator with associated metadata, collected annotations from another annotator and an expertise of a similar annotator determined to be within a threshold similarity with the annotator.

5. The system of claim 4, wherein the second machine learning model learns the annotator expertise based on a consensus validating the annotator's performance on the content.

6. The system of claim 4, wherein the second machine learning model learns the annotator expertise based on scoring the annotator's performance on the content.

7. The system of claim 4, wherein the second machine learning model learns the annotator expertise using ontology associated with the set of labels and the relationships among the set of labels maintained by the third machine learning model.

8. The system of claim 1, wherein the third machine learning model learns new relationships among labels and new user-provided labels.

9. The system of claim 1, wherein the content includes unlabeled content.

10. The system of claim 1, wherein the content includes partially labeled content.

11. The system of claim 1, wherein the processor is further configured to collect annotations from the annotator.

12. A computer-implemented method comprising:
determining, by at least one processor, a probable group of labels associated with content by running a first machine learning model using the content as input;
using a set of labels and relationships among the set of labels maintained dynamically, selecting automatically, by the at least one processor, by running a second machine learning model based on the probable group of labels automatically determined by the first machine learning model and received as input, an annotator having subject matter expertise associated with the probable group of labels, the second machine learning model configured to learn annotator expertise at least based on annotator behavior, the annotator behavior including at least an amount of time a given annotator takes in labeling a given content, the second machine learning model further configured to discover and learn that the annotator has expertise in other fields than a field associated with the probable set of labels, and update dynamically the annotator's area of expertise;
dynamically maintaining, by the at least one processor, by running a third machine learning model the set of labels and the relationships among the set of labels, the third machine learning model further configured to learn new relationships among the labels and new labels responsive to receiving annotator tagged new labels associated the content;
automatically queueing, by the at least one processor, the content in an in-memory queue associated with the annotator selected automatically by running the second machine learning model;
fetching, by the at least one processor, from the third machine learning model additional labels associated with the probable group of labels and also associated with a field of expertise of the annotator;
providing, by the at least one processor, the additional labels with the content to the in-memory queue associated with the annotator; and retraining, by the at least one processor, the first machine learning model and the second machine learning model based on annotations performed on the content by the annotator as feedback,
wherein at least some of the set of labels are provided to the annotator to label the content with the at least some of the set of labels,
the content that is labeled by the annotator being used as part of a training set for supervised machine learning, the content that is labeled by the annotator being usable for multiple domains without having to repeat a labeling process of the content for every domain of the multiple domains by using, for the supervised machine learning in different domains of the multiple domains, aggregated labels having hierarchical relationships with annotator provided labels of the content.

13. The method of claim 12, wherein the first machine learning model is trained to output labels for given content.

14. The method of claim 12, wherein the second machine learning model is trained to associate labels to annotators with a given confidence.

15. The method of claim 12, wherein the second machine learning model is trained to associate labels to annotators with a given confidence based on at least one of consensus validating the annotations performed on the content by the annotator, scoring of reliability associated with the annotator based on the annotations performed on the content by the annotator, and ontology associated with the set of labels and the relationships among the set of labels maintained dynamically.

16. The method of claim 12, wherein the content includes at least one of digital data, text, images, audio, video and media data.

17. A computer program product comprising a computer readable storage medium having program instructions embodied therewith, the program instructions readable by a device to cause the device to perform operations comprising:
dynamically and automatically associate content to an annotator based on machine learning of annotator expertise and dynamically maintain a set of labels and relationships among the labels, at least some of the set of labels being provided to the annotator to label the content with the at least some of the set of labels, the device further caused to run a first machine learning model using the content as input to determine a probable set of labels associated with the content;
automatically run a second machine learning model using the probable set of labels as input to automatically determine the annotator, the second machine learning model configured to learn annotator expertise at least based on annotator behavior, the annotator behavior including at least an amount of time a given annotator takes in labeling a given content, the second machine learning model further configured to discover and learn that the annotator has expertise in other fields than a field associated with the probable set of labels, and update dynamically the annotator's area of expertise;
automatically queue the content in an in-memory queue associated with the annotator, run a third machine learning model configured to maintain the set of labels and relationships among the labels, the third machine learning model further configured to learn new relationships among the labels and new labels responsive to receiving annotator tagged new labels associated the content;

fetch from the third machine learning model additional labels associated with the probable set of labels and also associated with a field of expertise of the annotator; and provide the additional labels with the content to the queue associated with the annotator, the content that is labeled by the annotator being used as part of a training set for supervised machine learning, the content that is labeled by the annotator being usable for multiple domains without having to repeat a labeling process of the content for every domain of the multiple domains by using, for the supervised machine learning in different domains of the multiple domains, aggregated labels having hierarchical relationships with annotator provided labels of the content.

* * * * *